3,082,190
ELECTRICAL GRADE AMINOTRIAZINE-ALDE-
HYDE-AMINE RESINOUS COMPOSITIONS
Leslie Boldizar, Wallingford, Conn., assignor to American Cyanamid Company, New York, N.Y., a corporation of Maine
No Drawing. Filed Aug. 1, 1960, Ser. No. 46,361
10 Claims. (Cl. 260—67.6)

This invention relates to novel, modified aminoplast resinous compositions, to products prepared therefrom, and to methods of producing such compositions and products. More particularly, this invention relates to novel, modified aminoplast resinous compositions possessing properties which render them particularly useful in the preparation of laminates and molded articles used primarily for electrical insulating purposes.

The aminoplast resinous compositions which are modified in accordance with my invention comprise resinous reaction products of ingredients comprising (a) an aldehyde, e.g., formaldehyde and (b) an aminotriazine containing at least 2 amidogen groups, each having at least one aldehyde-reactable hydrogen atom attached to the amidogen nitrogen atom, e.g., melamine. I have found that modification of this resinous reaction product by the addition thereto of (c) an aminotriazine and (d) one or more amines, in certain prescribed quantities and in a certain order, together with certain procedural steps, as will be set forth more fully hereinbelow, produces aminoplast resinous compositions possessing improved electrical properties which, in turn, are imparted to laminates produced therefrom.

The many excellent properties possessed by aminoplast resins, and in particular by melamine-formaldehyde resins, such as color, hardness and heat, solvent and chemical resistance, have led to their widespread use in the plastics, molding, coating and laminating fields. In many instances, modifiers have been added to aminoplast resins, thereby changing the ultimate properties of the cured materials or the properties of the resins during their cure. Thus, in some instances, modifiers have been added to improve the plastic flow characteristics of the resins during their cure, while in other instances, modifiers have been utilized to improve dimensional stability, workability, post-formability, or to impart any number of additional desirable properties to the cured resins.

Modifiers which are utilized to improve certain properties may also adversely affect others. For example, aminoplast resins have been modified by the addition of such phenolic materials as cresols, phenolic resins, and phenol itself, to produce modified compositions which give extremely strong, heat-resistant bonds and which cure more rapidly and completely than the unmodified aminoplast resins. At the same time however, the resulting compositions become more subject to failure under electric arc.

Because of their high arc resistance and high flexural strength, the aminoplast resins and, in particular, melamine-formaldehyde resins, are especially useful for the production of electrical grade laminated and molded articles. The aminoplast resins give a thorough impregnation in laminating assemblies, thereby insuring a complete bond in the laminate, while at the same time resistance to discoloration and degradation due to heat and light is also realized. Aminoplast resinous compositions previously employed in the production of electrical grade laminates have not been entirely satisfactory, however, inasmuch as laminating assemblies prepared therefrom have a high criticality of pressing, i.e., they can only be press-cured within very narrow ranges of temperatures and time.

A further and more serious disadvantage inherent in known electrical grade laminated articles containing aminoplast resin binders is the fact that their dielectric properties, i.e., their strength as non-conductors or their resistance to electrical strain, tend to break down under wet conditions.

These disadvantages, and especially the latter, preclude the use of electrical grade aminoplast laminates in many important areas. This is particularly true with respect to military field equipment, where electrical insulation must possess and keep high dielectric strength under extreme conditions of weather and use.

It is, therefore, an object of my invention to prepare novel, modified aminoplast resinous compositions.

It is also an object of my invention to prepare novel, modified aminoplast resinous compositions which will overcome the aforementioned disadvantages when used in the preparation of electrical grade laminates.

A further object of my invention is the use of my novel, modified aminotriazine-aldehyde resins, and particularly my novel, modified melamine-formaldehyde resins, in the preparation of electrical grade glass-filled laminates useful for electrical insulating purposes and having reduced criticality of curing and improved dielectric properties under extended wet conditioning, while retaining the high arc resistance and flexural strength normally associated with unmodified aminotriazine-aldehyde resins, and in particular with melamine-formaldehyde resins.

These and other objects of my invention will be discussed more fully hereinbelow.

The preferred process for preparing my novel, modified aminoplast resinous compositions comprises the following steps:

(A) preparing a partially polymerized aminoplast resin comprising an aldehyde and an aminotriazine, (B) adding a small amount of an aminotriazine to the partially polymerized aminoplast resin, (C) heat-treating the resulting syrup for a short period of time, (D) cooling the hot syrup, and then blending therewith a small amount of one or more amines.

In step B of my preferred process as outlined above, the addition of a small amount of aminotriazine to the partially polymerized aminotriazine-aldehyde resin serves to cut back the mol ratio of aldehyde to aminotriazine in said resin to within a definite critical range, as will also be discussed in greater detail hereinbelow. Laminating assemblies containing as binders the resinous compositions prepared according to this preferred process are capable of being press-cured within wide ranges of temperature and time, e.g., at temperatures ranging from about 145° C. to about 165° C. and press times ranging from about 15 to about 45 minutes.

As an alternative to the preferred procedure as outlined above, I may also prepare novel, modified aminoplast resinous compositions by starting with a partially polymerized aminotriazine-aldehyde resin having a mol ratio of aldehyde to aminotriazine within the definite critical range referred to above and adding thereto a small amount of one or more amines, thus omitting steps B and C. Laminating assemblies containing resinous compositions prepared in this manner also exhibit improved dielectric properties on extended wet conditioning, although to a lesser extent than those containing resins prepared according to my preferred procedure. However, they have a high criticality of pressing, and may only be press-cured within limited ranges of temperature and time, in much the same manner as assemblies containing unmodified melamine-formaldehyde resin. In addition, the aminoplast resinous compositions prepared in accordance with the preferred procedure as outlined above are capable of being stored for extended periods of time, usually up to several months, prior to their being cured. In contrast to this, resinous compositions prepared by the alternate procedure are less stable, and in most instances cannot be stored for more than 48 hours.

The resinous syrups prepared in accordance with my invention may be used as such to prepare laminates or may be dried for future use. Drying may be accomplished in a plurality of ways, such as by spray drying, kettle drying, tray drying and the like, but it is preferred that spray drying be used.

As is well known, aminoplast resins are synthetic resins prepared by the condensation reaction of an amino (including imino) or amido (including imido) compound with an aldehyde, a typical example being melamine-formaldehyde resins. Aminoplast resins of the type which may be modified in accordance with the present invention have been shown, for example, in U.S. 2,197,-357; 2,310,004 and 2,328,592 to Widmer et al. and in U.S. 2,260,239 to Talbot. The present invention is concerned particularly with the modification of partially polymerized aminoplast resins which are condensation products of ingredients comprising an aldehyde, e.g., formaldehyde and an aminotriazine containing at least one hydrogen atom and preferably two hydrogen atoms attached to the amidogen nitrogen atom.

In step B of my preferred process as outlined above, I prefer to use those partially polymerized aldehyde-aminotriazine resins which are heat curable or potentially heat curable resinous reaction products of ingredients comprising melamine and formaldehyde. However, other heat curable or potentially heat curable partially polymerized aldehyde-aminotriazine resinous reaction products may also be employed. Aminotriazines containing at least two amidogen groups, each having at least one aldehyde-reactable hydrogen atom attached to the amidogen nitrogen atom, which may be reacted with an aldehyde to provide the partially polymerized product which is modified in accordance with my invention and which also may be added to said partially polymerized product in accordance with step B of my preferred process include, among others, the triamino-s-triazines represented by the structural formula:

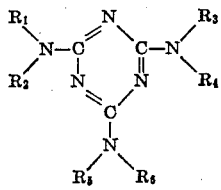

wherein any of $R_1$ to $R_6$ may be hydrogen, alkyl, cycloalkyl, alkenyl, cycloalkenyl, aryl, aralkyl, akaryl, hydroxyalkyl, akoxyalkyl, amino or substituted amino (e.g., alkylamino, dialkylamino, etc.), with the proviso that in at least two of the amidogen substituents directly attached to the carbon atoms of the triazine nucleus at least one R is hydrogen. An illustrative but by no means exhaustive enumeration of such amino-s-triazines includes the following: 2 - mono-R-amino-4,6-diamino-s-triazines such as the N-methyl, N-butyl, N-phenyl, N-tolyl and N-cyclohexyl melamines; 2,4,6-tris (mono-R-amino)-s-triazines such as 2,4,6-tris (methylamino)-s-triazine; 2 - di - R - amino-4,6-bis (mono-R-amino)-s-triazines such as 2-dimethylamino-4,6-bis (methylamino)-s-triazine; the methylolmelamines, such as mono-, di-, and trimethylolmelamines, $N^2$ - dimethylol - $N^4,N^6$ - bis (methylol)-melamine; hydrazino-s-triazines, such as 2,4,6-trihydrazino-s-triazine; and the like.

Another suitable class of aminotriazines comprises the diamino-s-triazines represented by the structural formula:

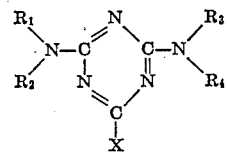

wherein each of $R_1$ to $R_4$ have the same meaning as given above and in which X is hydrogen, hydroxy, alkyl, cycloalkyl, alkenyl, cycloalkenyl, aryl, aralkyl, alkaryl, hydroxyalkyl or alkoxyalkyl, again with the proviso that in each of the amdiogen substituents directly attached to the carbon atoms of the triazine nucleus at least one R is hydrogen.

Illustrative of this class of s-triazines are the following: guanamines, such as formoguanamine, acetoguanamine, capryloguanamine, methacryloguanamine, sorboguanamine, adipoguanamine, sebacoguanamine, $\Delta^3$-tetrahydrobenzoguanamine, hexahydrobenzoguanamine, benzoguanamine, phenylacetoguanamine, diphenyladipoguanamine; ammeline, 2 - chloro-4,6-diamino-s-triazine and the like.

In step B of my preferred process, I also prefer to use an aminotriazine corresponding to the aminotriazine component of the partially polymerized aminoplast resin. Thus, in my preferred embodiment, monomeric melamine is added to a melamine-formaldehyde resin. However, any of the aminotriazines listed above, whether the same as or different from the aminotriazine component of the partially polymerized aminoplast resin, may be used as modifiers.

Any suitable aldehyde may be utilized as a reactant with the aminotriazine in preparing the partially polymerized aminoplast resin. I prefer to employ formaldehyde, either as such or as an aqueous solution. Other aldehydes such as, for example, acetaldehyde, propionaldehyde, butyraldehyde, benzaldehyde, furfural; mixtures thereof, or mixtures of formaldehyde with other such aldehydes may be employed. Paraformaldehyde, hexamethylenetetramine, trioxymethylene, paraldehyde, or other compounds engendering aldehydes may also be employed.

The properties desired in the finished product and economic considerations are among the features which will determine the choice of the particular aldehyde and aminotriazine employed.

In general, the partially polymerized aminotriazine-aldehyde resins are prepared in accordance with techniques well known in the art. The mol ratio of aldehyde to aminotriazine employed in the preparation of the partially polymerized aminoplast resin utilized in step A is not critical, and may be within the order of from about 1.5:1 to about 6:1 or higher, respectively, depending on the nature of the starting materials and the characteristics desired in the final products. For example, low mol ratios of aldehyde to aminotriazine are required where the latter reactant is a partially methylolated aminotriazine.

In preparing the partially polymerized aminotriazine-aldehyde resinous starting materials, the aldehyde and aminotriazine are heat reacted, e.g., at temperatures ranging from about 40° C. to reflux temperatures, either alone or in the presence of a suitable solvent, such as water or a mixture of water and a minor amount of a lower aliphatic alcohol, for periods of time ranging from the time at which all of the aminotriazine present has gone into solution to the time at which the resin solids are no longer soluble in the particular reaction system employed. Reflux temperature will depend primarily on the nature of the aldehyde employed and the amounts of water and/or lower aliphatic alcohol present. For example, a reaction mixture containing commercial Formalin (a 37% aqueous solution of formaldehyde containing minor amounts of methanol) will reflux at from about 98° C. to about 102° C. In the case of a resin syrup wherein the mol ratio of aldehyde to aminotriazine is below about 2.3:1, respectively, the lower time limit, i.e., the time at which all of the aminotriazine present has gone into solution, may also be expressed as the time at which the syrup is no longer infinitely dilutable in water at 0° C., as is evidenced by the formation of a hydrophobe, i.e., milkiness or haziness, when a drop of the syrup is added to ice water. In the case of a resin syrup wherein the mol ratio of aldehyde to aminotriazine is greater than about 2.3:1, respectively, the lower time limit is evidenced by the appearance of a clear solution. In either case, the resin solids at maximum dilution at 30° C. at the lower time limit will be in the order of at least about 5%. It will be appreciated by those skilled in the art that the upper time limit for the reaction of step A, i.e., the time at which the resin solids precipitate from the reaction medium, is a function of the initial concentration of aldehyde reactant employed.

The aminotriazine modifier utilized in step B of my preferred process is added in an amount sufficient to adjust the final mol ratio of aldehyde to aminotriazine(s) in the novel modified aminoplast resinous composition to within the order of from about 1.45:1 to about 1.95:1, respectively. Preferably this final mol ratio of aldehyde to aminotriazine(s) will be within the order of from about 1.6:1 to about 1.8:1, respectively. The precise amount of aminotriazine modifier necessary to accomplish the stated purpose is readily calculable from the mol ratio of reactants in the partially polymerized aminotriazine-aldehyde resinous starting material. For example, the amount of aminotriazine added to a partially polymerized aminotriazinealdehyde resin having a 2:1 mol ratio of aldehyde to aminotriazine will be within the range of from about 2% to about 25% by weight, based on the total weight of resin solids in the partially polymerized resin.

Following the addition of the aminotriazine modifier in step B of my preferred process, the resinous syrup is subjected to heat reaction at a temperature ranging from an initial temperature of about 40° C. to about 100° C., preferably at from about 85° C. to about 100° C., for a period of time ranging from about 30 minutes to about 120 minutes. This heat reaction is continued until the resin solids at maximum dilution at 30° C. has been raised to within the range of from about 20% to about 35%, by weight. Resin solids at maximum dilution at 30° C. is measured by adding small increments of water at a temperature of 30° C. to a 10–20 gram sample of the resin syrup, also at 30° C., until the first appearance of milkiness is produced. The appropriate values are then substituted in the formula:

$$\frac{W \times 100}{W_1 + W_2} = \text{Resins solds at maximum dilution at 30° C.}$$

where W equals the total weight of resin solids calculated from the mol ratios of aldehyde and aminotriazine(s) present, $W_1$ equals the weight of the sample of resin syrup and $W_2$ equals the total weight of water added.

When the desired stage of reaction is accomplished, as measured by resin solids at maximum dilution at 30° C., the resinous syrup is cooled to at least about 60° C. or below and there is added thereto a small amount of an amine or mixture of amines.

The alkylene polyamines, including the polyalkylene polyamines, constitute the preferred class of amines which may be employed as modifiers in the practice of my invention. 3,3'-iminobispropylamine is especially suitable, but other alkylene polyamines such as, for example, diethylene triamine, triethylene tetramine, tetraethylene, pentamine, tris-(3-aminopropyl)amine, ethylene diamine, trimethylene diamine, tetramethylene diamine and propylene diamine (1,2-diaminopropane) may also be employed.

My invention is not limited to the use of the abovementioned polyamines. A wide variety of other amines may also be employed. For example, I may use primary, secondary or tertiary amines in which the amino group is attached to a primary, secondary or tertiary aliphatic carbon atom. Such amines may have as substituents hydrocarbon radicals, e.g., alkyl, isoalkyl, cycloalkyl, cycloalkenyl, aryl, aralkyl and alkaryl radicals which may also contain hydrocarbon, substituted hydrocarbon and non-hydrocarbon substituents; heterocyclic or substituted heterocyclic radicals, and various combinations thereof. Specific examples of such amines include methylamine, isopropylamine, 2-aminobutane, t-butyl amine, 2-amino-4-methylpentane, various amyl, hexyl, heptyl, octyl and higher homologous primary amines wherein the amine group is attached to a primary, secondary or tertiary carbon atom; cyclopentyl amine, alkylated cyclopentyl amines, cyclohexylamine, mono-, di- and trimethyl cyclohexylamines, other alkylated cyclohexylamines; benzylamine, β-phenylethylamine, alkylated benzylamines, tetrahydrobetanaphthylamine; di-methyl-, di-ethyl-, di-n-propyl-, di-isopropyl-, and di-butyl amines; various secondary amines derived from amyl, hexyl, heptyl, octyl and higher homologous alkyl groups, methyl isobutyl amine, N-methyl-N-t-butyl amine, N-alkyl-N-cyclohexyl amines, N-alkyl-N-benzyl amines, and their homologs and analogs; dicyclopentyl amine, dicyclohexyl amine, alkylated dicyclohexyl amines; diphenylamine, dibenzylamine, di-(β-phenylethyl)amine; trimethyl-, triethyl-, tri-n-propyl-, tri-isopropyl-, and tributyl amine, higher homologous and isomeric trialkylamines; various N-substituted tertiary amines having different organic radicals on the amine nitrogen atom, e.g., alkyl alicyclic, aralkyl and like homologs and analogs; alkylol and alkyl alkylol amines such as ethanolamine, propanolamine, diethanolamine, triethanolamine, methylmethanolamine, methylethanolamine, ethylmethanolamine, dimethylmethanolamine, dimethylethanolamine, diethylethanolamine, dimethylpropanolamine, methyldimethanolamine, ethyldiethanolamine, propyldimethanolamine; heterocyclic amines such as piperidine, alkylated piperidines, morpholine, and the like.

Mixtures of the foregoing amines may also be employed. Tthe amine or mixture of amines may be added in amounts ranging from about 0.1% to 5% by weight, based on the total weight of resin solids present, depending on the basicity of the particular amine or amines employed. In the case of the alkylene polyamines, the amount added will be within the range of from about 0.1% to about 1.5%, by weight.

Compounds of the type set forth above have previously been utilized as modifiers for melamine-formaldehyde resins. Thus, U.S. 2,769,799 and 2,769,800 to Suen et al. disclose that by reacting melamine, formaldehyde (or a partially polymerized melamine-formaldehyde resin) and large amounts of a polyfunctional aliphatic polyamine such as 3,3'-iminobispropylamine (amounts ranging from about 0.5 atom to about 10 atoms of basic nitrogen present in the polyfunctional aliphatic polyamine per mole of melamine, i.e., at least 10% by weight) in the presence of an acid, modified resin compositions are obtained which are particularly useful as wet strengthening agents for paper. However, these patents reflect no appreciation of either the precise mode of treatment employed in the process of the present invention or of the use of very small amounts of such modifiers in said process. I have discovered that aminoplast resin starting materials must be modified by the addition of both aminotriazine and one or more of the amines set forth above in order to obtain improvements in criticality of pressing, storage stability and dielectric properties under wet conditions.

Once the amine or mixture of amines has been added to the aminoplast resinous composition and blended therewith, the novel modified aminoplast resinous composition may then be dried. A particularly advantageous method of drying the resinous syrup is spray drying.

The aminoplast resinous syrups of my invention can be spray dried in any industrial spray drier which will yield a finely divided white powder with a moisture content below about 1.5% (as determined by the Karl Fischer method). The resinous syrup is first pumped into the top of the drier either through a spray nozzle or onto a rotating disk. The syrup is then dispersed into a fine spray and dried almost instantly as it comes in contact with a blast of hot air that is introduced at the top of the drier. The dried resin, in powder form, settles to the bottom of the drying chamber. It is then swept out of the chamber and conveyed to suitable collectors for blending and packaging.

In order that those skilled in the art may more fully understand the inventive concept presented herein, the following illustrative examples are set forth. These examples are given by way of illustration and should not be considered as expressing limitations unless so set forth in the appended claims. All parts and percentages are by weight, unless otherwise stated.

EXAMPLE I 126 parts of melamine (1 mol) and 60 parts of formaldehyde (2 mols) in a 37% aqueous solution are introduced into a suitable reaction vessel equipped with thermometer, stirrer and reflux condenser. The reaction mixture is adjusted to a pH of 8.0 with aqueous 10 N NaOH and then heat reacted to 15 to 20 percent resin solids at maximum dilution at 30° C. The condensation product thus produced is adjusted to a pH of 8.8–9.2 with aqueous 10 N NaOH. The resin syrup is then refluxed for 10 minutes with an additional charge of 18.6 parts of melamine (10% based on total resin solids) to 25 to 30 percent resin solids at maximum dilution at 30° C. When the desired stage of reaction is accomplished, the resinous syrup is cooled to 60° C. and 0.615 part of 3,3'-iminobispropylamine (0.3% based on total resin solids) is blended into the syrup. The modified melamine-formaldehyde resinous syrup is then spray dried.

In order to show the outstanding dielectric properties of glass-filled laminates prepared from the novel modified aminoplast resinous compositions of this invention on extended wet conditioning, the following comparative data are presented. Specimens were tested according to the Proposed Military Specification, MIL-P-15037-C, which requires electrical grade laminates to withstand a dielectric breakdown test of at least 70 kv. (kilovolts) when dry and at least 50 kv. after having been soaked in water at 50° C. for 14 days before being considered suitable for military purposes. The results of a comparison made between an unmodified melamine-formaldehyde condensate having a mol ratio of formaldehyde to melamine of 2:1, respectively, (resin A), and the same resin modified in the manner of the instant invention by the addition of 10% melamine and 0.3% 3,3'-iminobispropylamine (product of Example I—resin B) as binders in electrical grade glass-filled laminates are summarized in the following table:

Table I

| Binder | Dielectric Breakdown Parallel to Lamination | |
|---|---|---|
| | kv.—Dry [1] | kv.—Wet-Conditioned [2] |
| Resin A | 50–80 | 10–40 |
| Resin B | 70–90 | 55–80 |

[1] Data on specimens before extended wet conditioning.
[2] Data on specimens after soaking in water at 50° C. for 14 days.

The laminate containing the unmodified resin failed to meet the requirements of the Proposed Military Specification on extended wet conditioning. The laminate containing modified resin B not only exceeded this requirement, but also was superior in dielectric properties before extended wet conditioning.

EXAMPLE II 126 parts of melamine (1 mol) and 60 parts of formaldehyde (2 mols) in a 37% aqueous solution are added together in a suitable reaction vessel, the pH is adjusted to 8.0 with aqueous 10 N NaOH and the reaction mixture is then heat reacted to 15 to 20 percent resin solids at maximum dilution at 30° C. The pH is again adjusted to 8.8–9.3 with aqueous 10 N NaOH and an additional charge of 37.2 parts of melamine (20% based on total resin solids) is introduced. After refluxing for 10 minutes to 25 to 30 percent resin solids at maximum dilution at 30° C., the resinous syrup is cooled to 60° C. and 0.67 part of 3,3'-iminobispropylamine is blended into the syrup.

EXAMPLE III 126 parts of melamine (1 mol) is added to 60 parts of formaldehyde (2 mols—in a 37% aqueous solution) in a suitable reaction vessel and the pH of the reaction mixture adjusted to 8.0 with aqueous 10 N NaOH. Heat reaction gives a resin syrup having from 15 to 20 percent resin solids at maximum dilution at 30° C. After pH adjustment to 8.8–9.2 with aqueous 10 N NaOH, this resin syrup is refluxed for 10 minutes with 9.3 parts of melamine (5% based on total resin solids) to 25 to 30 percent resin solids at maximum dilution at 30° C. The resulting modified resin syrup is cooled to 60° C. and 0.586 part of 3,3'-iminobispropylamine is blended therewith. The modified melamine-formaldehyde resinous syrup, when spray dried, exhibits excellent storage stability.

EXAMPLE IV 126 parts of melamine (1 mol) and 90 parts of formaldehyde (3 mols) in a 37% aqueous solution are introduced into a suitable reaction vessel equipped with thermometer, stirrer and reflux condenser, a pH of 6.8–7.2 is obtained with aqueous 10 N NaOH and the reaction mixture is heat reacted to 15 to 20 percent resin solids at maximum dilution at 30° C. The resin syrup thus produced is adjusted to a pH of 8.0–8.3 with aqueous 10 N NaOH, and then refluxed for 10 minutes with an additional 84 parts of melamine (39% based on total resin solids) to 25 to 30 percent resin solids at maximum dilution at 30° C. At this point, the resinous syrup is cooled to 60° C. and 0.9 part of 3,3'-iminobispropylamine is blended into the syrup. The modified melamine-formaldehyde resinous syrup may be used directly to prepare electrical grade laminates.

EXAMPLE V 126 parts of melamine (1 mol) and 60 parts of formaldehyde (2 mols) in a 37% aqueous solution are introduced into a suitable reaction vessel equipped with thermometer, stirrer and reflux condenser. The pH of the reaction mixture is adjusted to 8.0 with aqueous 10 N NaOH and the mixture is then heat reacted to 15 to 20 percent resin solids at maximum dilution at 30° C. Following pH adjustment to 8.8–9.2 with aqueous 10 N NaOH, the resin syrup is refluxed for 10 minutes with an additional charge of 18.6 parts of melamine (10% based on total resin solids) to 25 to 30 percent resin solids at maximum dilution at 30° C. When the desired stage of reaction is accomplished, the resinous syrup is cooled to 60° C. and 0.615 part of benzylamine is blended into the syrup.

EXAMPLE VI

A resin syrup having 15 to 20 percent of resin solids at maximum dilution at 30° C. is prepared from 126 parts of melamine (1 mol) and 60 parts of formaldehyde (2 mols) in a 37% aqueous solution. Aqueous 10 N NaOH is added to adjust the pH to 8.8–9.2, 18.6 parts of melamine (10% based on total resin solids) are added, and the mixture refluxed for 10 minutes to 25 to 30 percent resin solids at maximum dilution at 30° C. After cooling to 60° C., 2.05 parts of triethanolamine is blended into the syrup. The modified melamine-formaldehyde resinous syrup is then spray dried.

EXAMPLE VII 126 parts of melamine (1 mol) are added to 60 parts of formaldehyde (2 mols—in a 37% aqueous solution), the pH is adjusted to 8.0 with aqueous 10 N NaOH, and the mixture is heat reacted to 15 to 20 percent resin solids at maximum dilution at 30° C. The resin syrup is adjusted to a pH of 8.8–9.2 with aqueous 10 N NaOH, and then refluxed for 10 minutes with an additional charge of 18.6 parts of melamine (10% based on total resin solids) to 25 to 30 percent resin solids at maximum dilution at 30° C. The resulting resinous syrup is cooled to 60° C. and 2.05 parts of diethylethanolamine is blended into the syrup.

As has been previously noted, an extremely valuable embodiment of my invention comprises the impregnation of glass cloth with my novel, modified aminoplast resinous compositions to produce electrical grade glass-filled laminates having reduced criticality of curing and improved dielectric properties in addition to the high arc resistance and high flexural strength usually associated with aldehyde-aminotriazine resins. Glass cloth is commercially available in thickness ranging from about 0.002 to 0.015 inch, but the use of glass cloth of other dimensions is also within the scope of this invention. The term "glass cloth" as used herein is intended to cover any form of glass cloth, whether woven, knitted or otherwise prepared. All types of glass fibers, including continuous filaments and staple fibers, can be used in preparing the glass cloth. The term "glass" is intended to cover all types of glass, including the so-called silica glass.

Laminated articles may also be prepared by impregnating glass cloth containing cellulosic fibers together with the glass fibers with my novel, modified aminoplast resinous compositions. In this way, it is possible to obtain articles which have an excellent bond between the resin and the glass cloth-containing fabric, inasmuch as the cellulosic fibers, as is well known, appear to have a strong affinity for aminoplast resins, and in fact may react therewith. Thus, by utilizing a mixed glass fiber-cellulosic fiber cloth, the impregnating aminoplast resin is more nearly integrally bonded to the non-reactive glass fibers. This embodiment of my invention includes the use of several types of materials. For example, one such material may contain an interwoven mixture of glass fibers and cellulosic fibers. Similarly, glass fabrics which contain a mixture of cellulosic threads in either or both the warp and the woof and which may contain a different number of one kind of thread in the warp from that in the woof may be used. Still another type of glass cloth which may be used is one which contains threads which include both glass fibers and cellulosic fibers spun together. Mixtures of the various fabrics may also be used. Furthermore, the glass cloth fabrics may also contain fibers other than cellulosic and glass fibers. Such variations provide materials having particular properties rendering laminates produced therefrom especially suitable for specific purposes.

Other fabrics may be employed instead of or in conjunction with glass cloth, but it will be generally desirable to use only glass cloth if the ultimate products are to meet rigid specifications pertaining to such features as criticality of curing and dielectric properties on extended wet conditioning.

My novel modified aminoplast resinous compositions may be used to prepare laminates with other materials, such as paper, cellulosic fabrics and the like, and may also be used in the preparation of molding compositions containing as fillers asbestos, mica, chopped glass fibers or fabrics, and the like.

Conventional laminating techniques may be employed to impregnate fabrics such as glass cloth with my novel, modified aminoplast resinous compositions. In a typical procedure, the spray dried resinous compositions are dissolved in a solvent with agitation. Suitable solvents include water and mixtures of water with a lower aliphatic alcohol such as methanol, ethanol, propanol, isopropanol, n-butanol, isobutanol, and the like in a ratio of about 95:5, respectively. The resulting solutions will generally contain from about 50% to about 65% resin solids. The amount of resin solids present may be varied depending on the degree of resin pickup desired. Glass cloth is impregnated with the resinous solutions by dipping, roll coating, or any other suitable method, and then dried in a conventional hot air or infra red drier to a volatile content of less than 5% by weight. The resin pickup will generally be in the range of from about 30% to about 50% by weight. An assembly consisting of multiple layers of resin impregnated glass cloth is prepared and then pressed for from about 15 minutes to about 45 minutes at temperatures within a range of from about 145° C. to about 165° C. under pressures in the order of from about 800 to about 1500 p.s.i. The resulting laminate is cooled and removed from the press and is suitable for fabrication, e.g., as electrical insulation.

As is well known, aminoplast condensation reactions are influenced by pH, the rate of reaction being accelerated by low pH. At relatively high pH's, the reaction is so slow as to be impractical, while at relatively low pH's, the reaction is so fast as to be uncontrollable, or else the nature of the product is such that it has little utility in plastics applications such as thermosetting laminating and molding resins. Thus, the practical pH working range for the preparation of aminotriazine-aldehyde resin suitable for use in laminating and molding operations is generally given as from about 6.5 to about 10, although wider pH ranges may be employed under certain conditions.

Narrower pH ranges may also be employed in preparing my novel, modified aminoplast resinous compositions. Thus, in step A of my preferred process as outlined above, the pH may vary from about 7.0 to about 8.5. When the reaction of step A has proceeded to the desired stage, the pH may be adjusted to within a range of from about 8.0 to about 9.5 or higher. This may be accomplished by the added aminotriazine itself if it is of sufficient basicity, but any catalyst, e.g., weakly acidic or basic organic or inorganic solutions, may be employed to adjust the pH when required. A particularly suitable catalyst is aqueous NaOH.

It will be obvious that other changes and variations may be made in carrying out the present invention without departing from the spirit and scope thereof as defined in the appended claims.

I claim:

1. A modified resinous composition which, when cured, exhibits improved dielectric properties under extended wet conditioning which comprises a blend of (A) a resinous reaction product of (1) an aminotriazine-aldehyde resin having a mol ratio of aldehyde:aminotriazine of from about 1.5:1 to about 6:1, respectively; and (2) at least about 2% by weight, based on the total weight of resin solids in said (1), of a monomeric aminotriazine, each of the aminotriazine components of said (A) initially containing at least two amidogen groups each having at least one aldehyde-reactable hydrogen atom attached to the amidogen nitrogen atom, the mol ratio of aldehyde:aminotriazine in said (A) being from about 1.45:1 to about 1.95:1, respectively, said (A) having been prepared by reacting said (1) and said (2) at a temperature of from about 40° C. to about 100° C. until the resin solids at maximum dilution at 30° C. ranged from about 20% to about 35% by weight, and (B) from about 0.1% to about 1.5% by weight, based on the total weight of resin solids present, of any alkylene polyamine.

2. A modified resinous composition which, when cured, exhibits improved dielectric properties under extended wet conditioning which comprises a blend of (A) a resinous reaction product of (1) an aminotriazine-aldehyde resin having a mol ratio of aldehyde:aminotriazine of from about 1.5:1 to about 6:1, respectively, and (2) at least about 2% by weight, based on the total weight of resin solids in said (1), of a monomeric aminotriazine, each of the aminotriazine components of said (A) initially containing at least two amidogen groups each having at least one aldehyde-reactable hydrogen atom attached to the amidogen nitrogen atom, the mol ratio of aldehyde:aminotriazine in said (A) being from about 1.45:1 to about 1.95:1, respectively, said (A) having been prepared by reacting said (1) and said (2) at a temperature of from about 40° C. to about 100° C. until the resin solids at maximum dilution at 30° C. ranged from about 20% to about 35% by weight, and (B) from about 0.1% to about 1.5% by weight, based on the total weight of resin solids present, of a polyalkylene polyamine.

3. A modified resinous composition which, when cured, exhibits improved dielectric properties under extended wet conditioning which comprises a blend of (A) a resinous reaction product of (1) an aminotriazine-aldehyde resin having a mol ratio of aldehyde:aminotriazine of from about 1.5:1 to about 6:1, respectively, and (2) at least about 2% by weight, based on the total weight of resin solids in said (1), of a monomeric aminotriazine different from the aminotriazine component of said (1), each of the aminotriazine components of said (A) initially containing at least two amidogen groups each having at least one aldehyde-reactable hydrogen atom attached to the amidogen nitrogen atom, the mol ratio of aldehyde:aminotriazine in said (A) being from about 1.45:1 to about 1.95:1, respectively, said (A) having been prepared by reacting said (1) and said (2) at a temperature of from about 40° C. to about 100° C. until the resin solids at maximum dilution at 30° C. ranged from about 20% to about 35% by weight, and (B) from about 0.1% to about 1.5% by weight, based on the total weight of resin solids present, of an alkylene polyamine.

4. A modified resinous composition which, when cured, exhibits improved dielectric properties under extended wet conditioning which comprises a blend of (A) a resinous reaction product of (1) an aminotriazine-aldehyde resin having a mol ratio of aldehyde:aminotriazine of from about 1.5:1 to about 6:1, respectively, and (2) at least about 2% by weight, based on the total weight of resin solids in said (1), of a monomeric aminotriazine corresponding to the aminotriazine component of said (1), said aminotriazine components of said (A) initially containing at least two amidogen groups each having at least one aldehyde-reactable hydrogen atom attached to the amidogen nitrogen atom, the mol ratio of aldehyde:aminotriazine in said (A) being from about 1.45:1 to about 1.95:1, respectively, said (A) having been prepared by reacting said (1) and said (2) at a temperature of from about 40° C. to about 100° C. until the resin solids at maximum dilution at 30° C. ranged from about 20% to about 35% by weight, and (B) from about 0.1% to about 1.5% by weight, based on the total weight of resin solids present, of an alkylene polyamine.

5. A modified resinous composition which, when cured, exhibits improvedf dielectric properties under extended wet conditioning which comprises a blend of (A) a resinous reaction product of (1) a melamine-formaldehyde resin having a mol ratio of formaldehyde:melamine of from about 1.5:1 to about 6:1, respectively, and (2) at least about 2% by weight, based on the total weight of resin solids in said (1), of melamine, the mol ratio of formaldehyde:melamine in said (A) being from about 1.45:1 to about 1.95:1, respectively, said (A) having been prepared by reacting said (1) and said (2) at a temperature of from about 40° C. to about 100° C. until the resin solids at maximum dilution at 30° C. ranged from about 20% to about 35% by weight, and (B) from about 0.1% to about 1.5% by weight, based on the total weight of resin solids present, of 3,3'-iminobispropylamine.

6. A process for the preparation of a modified resinous composition which, when cured, exhibits improved dielectric properties under extended wet conditioning which comprises (A) heat reacting, at a temperature of from about 40° C. to about 100° C. until the resin solids at maximum dilution at 30° C. ranges from about 20% to about 35% by weight, (1) an aminotriazine-aldehyde resin having a mol ratio of aldehyde:aminotriazine of from about 1.5:1 to about 6:1, respectively, with (2) at least about 2% by weight, based on the total weight of resin solids in said (1), of an aminotriazine to form a resin syrup wherein the mol ratio of aldehyde:aminotriazine is from about 1.45:1 to about 1.95:1, respectively, each of the aminotriazines of said (1) and (2) initially containing at least two amidogen groups each having at least one aldehyde-reactable hydrogen atom attached to the amidogen nitrogen atom, (B) cooling the resulting resin syrup to at least about 60° C., (C) blending with the cooled syrup from about 0.1% to about 1.5% by weight, based on the total weight of resin solids present, of an alkylene polyamine, and (D) recovering the resulting modified aminoplast resinous composition.

7. A process for the preparation of a modified resinous composition which, when cured, exhibits improved dielectric properties under extended wet conditioning which comprises (A) heat reacting, at a temperature of from about 40° C. to about 100° C. until the resin solids at maximum dilution at 30° C. ranges from about 20% to about 35% by weight, (1) an aminotriazine-aldehyde resin having a mol ratio of aldehyde:aminotriazine of from about 1.5:1 to about 6:1, respectively, with (2) at least about 2% by weight, based on the total weight of resin solids in said (1), of an aminotriazine to form a resin syrup wherein the mol ratio of aldehyde:aminotriazine is from about 1.45:1 to about 1.95:1, respectively, each of the aminotriazines of said (1) and (2) initially containing at least two amidogen groups each having at least one aldehyde-reactable hydrogen atom attached to the amidogen nitrogen atom, (B) cooling the resulting resin syrup to at least about 60° C., (C) blending with the cooled syrup from about 0.1% to about 1.5% by weight, based on the total weight of resin solids present, of a polyalkylene polyamine, and (D) recovering the resulting modified aminoplast resinous composition.

8. A process for the preparation of a modified resinous composition which, when cured, exhibits improved dielectric properties under extended wet conditioning which comprises (A) heat reacting, at a temperature of from about 40° C. to about 100° C. until the resin solids at maximum dilution at 30° C. ranges from about 20% to about 35% by weight, (1) an aminotriazine-aldehyde resin having a mol ratio of aldehyde:aminotriazine of from about 1.5:1 to about 6:1, respectively, with (2) at least about 2% by weight, based on the total weight of resin solids in said (1), of an aminotriazine different from the aminotriazine component of said (1) to form a resin syrup wherein the mol ratio of aldehyde:aminotriazine is from about 1.45:1 to about 1.95:1, respectively, each of the aminotriazines of said (1) and (2) initially containing at least two amidogen groups each having at lest one aldehyde-reactable hydrogen atom attached to the amidogen nitrogen atom, (B) cooling the resulting resin syrup to at least about 60° C., (C) blending with the cooled syrup from about 0.1% to about 1.5% by weight, based on the total weight of resin solids present, of an alkylene polyamine, and (D) recovering the resulting modified aminoplast resinous composition.

9. A process for the preparation of a modified resinous composition which, when cured, exhibits improved dielectric properties under extended wet conditioning which comprises (A) heat reacting, at a temperature of from about 40° C. to about 100° C. until the resin solids at maximum dilution at 30° C. ranges from about 20% to azine is from about 1.45:1 to about 1.95:1, respectively, resin having a mol ratio of aldehyde:aminotriazine of from about 1.5:1 to about 6:1, respectively, with (2) at least about 2% by weight, based on the total weight of resin solids in said (1), of an aminotriazine corresponding to the aminotriazine component of said (1) to form a resin syrup wherein the mol ratio of aldehyde:aminotriazine is from about 1.45:1 to about 1.95:1, respectively, said aminotriazine initially containing at least two amidogen groups each having at least one aldehyde-reactable hydrogen atom attached to the amidogen nitrogen atom, (B) cooling the resulting resin syrup to at least about 60° C., (C) blending with the cooled syrup from about 0.1% to about 1.5% by weight, based on the total weight of resin solids present, of an alkylene polyamine, and (D) recovering the resulting modified aminoplast resinous composition.

10. A process for the preparation of a modified resinous composition which, when cured, exhibits improved dielectric properties under extended wet conditioning which comprises (A) heat reacting, at a temperature of from about 40° C. to about 100° C. until the resin solids at maximum dilution at 30° C. ranges from about 20% to about 35% by weight, (1) a melamine-formaldehyde resin having a mol ratio of formaldehyde:melamine of from about 1.5:1 to about 6:1, respectively, with (2) at least about 2% by weight, based on the total weight of resin solids in said (1), of melamine to form a resin syrup wherein the mol ratio of formaldehyde:melamine is from about 1.45:1 to about 1.95:1, respectively, (B) cooling the resulting resin syrup to at least about 60° C., (C) blending with the cooled syrup from about 0.1% to about 1.5% by weight, based on the total weight of resin solids present, of 3,3'-iminobispropylamine, and (D) recovering the resulting modified aminoplast resinous composition.

References Cited in the file of this patent
UNITED STATES PATENTS

| | | |
|---|---|---|
| 2,769,797 | Suen et al. | Nov. 6, 1956 |
| 2,769,799 | Suen et al. | Nov. 6, 1956 |
| 2,769,800 | Suen et al. | Nov. 6, 1956 |
| 2,773,794 | Frazer et al. | Dec. 11, 1956 |
| 2,796,362 | Wooding et al. | June 18, 1957 |